US012755503B2

(12) United States Patent
Ravella et al.

(10) Patent No.: US 12,755,503 B2
(45) Date of Patent: Oct. 6, 2026

(54) SYSTEMS AND METHODS FOR IMPROVED ACOUSTIC DATA AND SAMPLE ANALYSIS

(71) Applicant: VERACIO LTD., Salt Lake City, UT (US)

(72) Inventors: Michael Ravella, Salt Lake City, UT (US); Michael Case, Mississauga (CA)

(73) Assignee: VERACIO LTD., Salt Lake City, UT (US)

( * ) Notice: Subject to any disclaimer, the term of this patent is extended or adjusted under 35 U.S.C. 154(b) by 247 days.

(21) Appl. No.: 18/683,086

(22) PCT Filed: Jul. 22, 2022

(86) PCT No.: PCT/US2022/038035
§ 371 (c)(1),
(2) Date: Feb. 12, 2024

(87) PCT Pub. No.: WO2023/022843
PCT Pub. Date: Feb. 23, 2023

(65) Prior Publication Data
US 2024/0378841 A1 Nov. 14, 2024

Related U.S. Application Data

(60) Provisional application No. 63/233,545, filed on Aug. 16, 2021.

(51) Int. Cl.
*G06V 10/24* (2022.01)
*G06T 7/33* (2017.01)
(Continued)

(52) U.S. Cl.
CPC .............. *G06V 10/24* (2022.01); *G06T 7/344* (2017.01); *G06V 10/70* (2022.01); *G06V 20/50* (2022.01);
(Continued)

(58) Field of Classification Search
CPC ........ G06V 10/24; G06V 10/70; G06V 20/50; G06V 10/80; G06V 10/803; G06V 10/806;
(Continued)

(56) References Cited

U.S. PATENT DOCUMENTS

2009/0259446 A1* 10/2009 Zhang .................... E21B 49/00 703/2
2014/0182935 A1* 7/2014 Weaver .................. E21B 10/02 175/45
(Continued)

OTHER PUBLICATIONS

Shigematsu, Norio et al. "Orienting drill core using borehole-wall image correlation analysis", Oct. 2014, Journal of Structural Geology, vol. 67, part B, pp. 293-299. DOI: <https://doi.org/10.1016/j.jsg.2014.01.016>. (Year: 2014).*
(Continued)

*Primary Examiner* — Matthew C Bella
*Assistant Examiner* — Nicholas John Helco
(74) *Attorney, Agent, or Firm* — Ballard Spahr LLP

(57) ABSTRACT

Provided herein are methods and systems for improved acoustic data and sample analysis. A machine learning model may align an image of a sample with an acoustic image associated with the sample. The alignment of the image of the sample with the acoustic image may be used to generate a virtual orientation line. An output image comprising the virtual orientation line and the image of the sample may be generated. The output image may be displayed at a user interface that allows a user to interact with the output image.

20 Claims, 13 Drawing Sheets

(51) Int. Cl.
*G06V 10/70* (2022.01)
*G06V 20/50* (2022.01)

(52) U.S. Cl.
CPC ............... *G06T 2207/20081* (2013.01); *G06T 2207/30181* (2013.01)

(58) Field of Classification Search
CPC .... G06V 10/809; G06V 10/811; G06V 10/82; G06V 20/64; G06V 20/647; G06V 20/70; G06V 2201/06; G06V 2201/10; G06T 7/344; G06T 2207/20081; G06T 2207/30181; G06T 2219/2004; G06T 17/05; G06T 2210/21; G06T 2207/10028; G06T 2207/10132; G06T 2207/10136; G06T 2207/20084; G06T 2207/20212; G06T 2207/30108; G06T 2207/30132; G06T 2207/30172; G06T 2207/30244; G06T 7/174; G06T 7/194; G06T 7/50; G06T 7/66; G01V 2210/616; G01V 2210/64; G01V 1/50; G01V 2210/646; G01V 2210/6161; G01V 2210/6169; G01V 2210/54; G01V 2210/1299; G01V 2210/1429; G06N 20/20
See application file for complete search history.

(56) References Cited

U.S. PATENT DOCUMENTS

| | | | | |
|---|---|---|---|---|
| 2015/0146936 | A1* | 5/2015 | Mezghani | G06T 17/10 382/109 |
| 2017/0067337 | A1 | 3/2017 | Havens et al. | |
| 2017/0286802 | A1* | 10/2017 | Mezghani | E21B 49/02 |
| 2019/0129027 | A1* | 5/2019 | Stuart | G01H 3/125 |
| 2019/0195061 | A1* | 6/2019 | Ramsay | E21B 47/002 |
| 2021/0192712 | A1* | 6/2021 | Maeso | E21B 47/00 |
| 2021/0349070 | A1* | 11/2021 | Gettemy | G01N 23/2251 |
| 2021/0358103 | A1* | 11/2021 | Vaidyanathan | G06T 7/0002 |
| 2021/0407156 | A1* | 12/2021 | Hu | E21B 47/002 |
| 2022/0327713 | A1* | 10/2022 | Maximo | E21B 41/00 |

OTHER PUBLICATIONS

Rogers, S.F. et al. "Orientation of drill core by use of borehole geophysical imaging", Dec. 2000, Applied Earth Science: Transactions of the Institutions of Mining and Metallurgy [online], vol. 109, No. 3, pp. B184-B190. DOI: <https://doi.org/10.1179/aes.2000.109.3.184>. (Year: 2000).*

International Search Report, dated Nov. 30, 2022, issued in International Application No. PCT/US2022/038035, ISA/US.

* cited by examiner

SYSTEMS AND METHODS FOR IMPROVED ACOUSTIC DATA AND SAMPLE ANALYSIS

CROSS-REFERENCE TO RELATED PATENT APPLICATION

This application is a national phase filing under 35 U.S.C. § 371 of International Application No. PCT/US2022/038035, filed Jul. 22, 2022, which claims priority to U.S. Provisional Patent Application No. 63/233,545, filed on Aug. 16, 2021, both of which are incorporated by reference in their entireties herein.

BACKGROUND

Typically, analysis of structural features of drilled or excavated samples on-site requires tedious and time-consuming labor. On-site analysis may frequently be associated with lengthy transaction times and delays associated with equipment availability, personnel availability, etc. Some automated analysis techniques analyze images of samples and determine physical features indicated therein. However, some of these techniques may be affected by operator error when samples are improperly handled. Further, some of these techniques cannot correlate depth levels to the physical features shown the images. These and other considerations are discussed herein.

SUMMARY

It is to be understood that both the following general description and the following detailed description are exemplary and explanatory only and are not restrictive. Provided herein are methods and systems for improved acoustic data and sample analysis. A sample may comprise a core sample, a rock sample, a mineral sample, a combination thereof, and/or the like. A machine learning model may analyze an acoustic image(s) associated with a sample(s). The acoustic image(s) may be captured with an imaging device. The acoustic image(s) may be indicative of a borehole from which the sample(s) was extracted. The machine learning model may align an image(s) of the sample (hereinafter a "sample image(s)") with the acoustic image(s).

The acoustic image may be associated with orientation data indicative of an orientation, a depth, etc., of the sample(s) within the borehole. The machine learning model may align the acoustic image(s) with the sample image(s) without relying upon the orientation data and/or the depth of the sample(s) within the borehole. Once the acoustic image(s) is aligned with the sample image(s), the orientation data may be used to determine an orientation of the sample(s). Using the orientation of the sample(s), a virtual orientation line may be generated for the sample image(s). For example, the virtual orientation line may be overlain on the sample image(s).

An output image may be generated. The output image may comprise the sample image and an overlay indicating the virtual orientation line. In some examples, structural data associated with the sample may be determined. The structural data may comprise one or more physical features associated with the sample. The output image may be displayed (e.g., provided) at a user interface. The user interface may be used to interact with the output image. For example, the user interface may enable a user to modify, edit, save, and/or send the output image.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein.

DETAILED DESCRIPTION

Figure 1A:
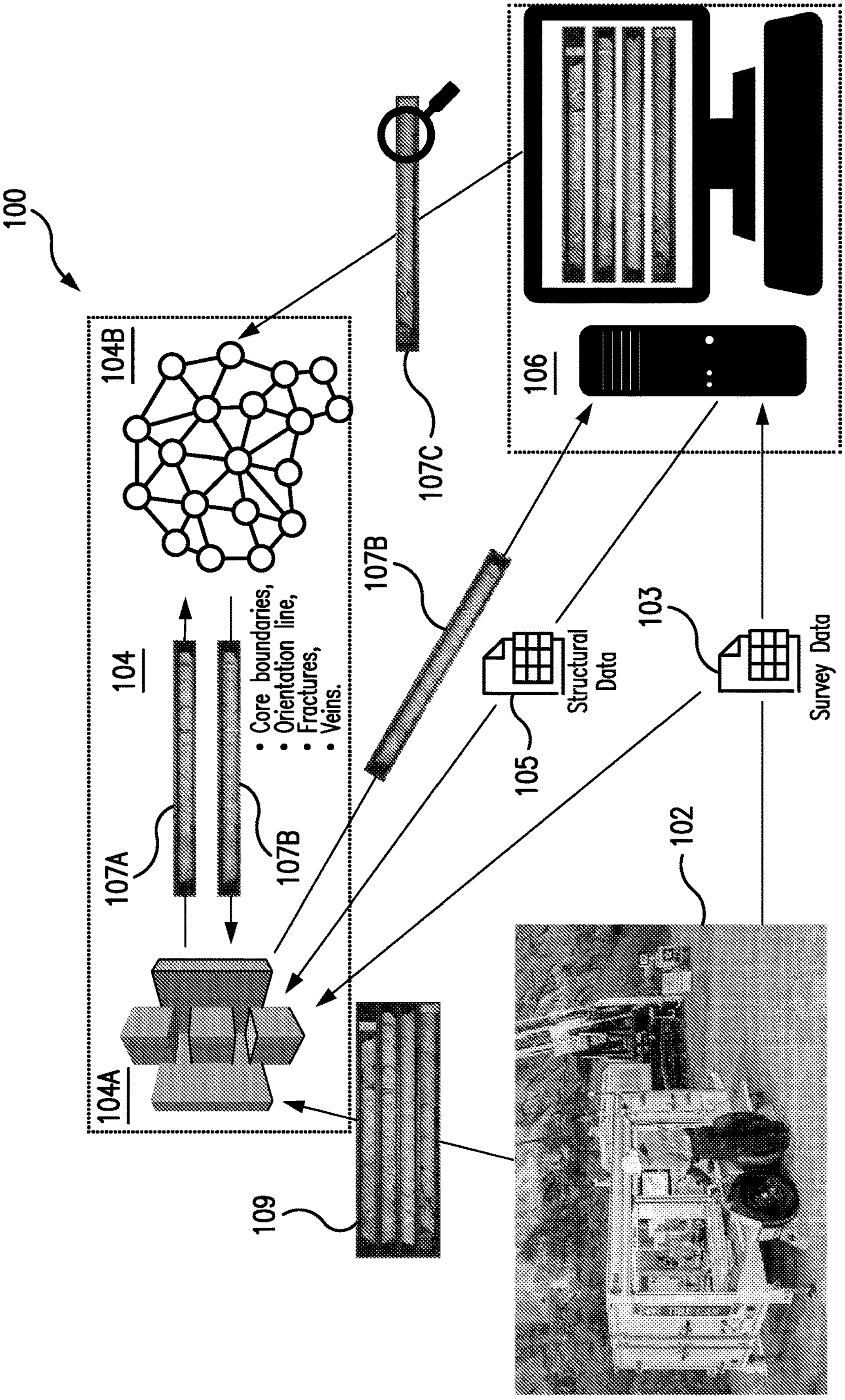
FIG. 1A shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

The word "sample" as used herein may refer to one of or more of a piece, a chip, a portion, a mass, a chunk, etc., of a core(s), a rock(s), a mineral(s), a material(s), a borehole(s), a pit wall(s), or any other organic (or inorganic) matter. For example, a sample may refer to a core sample, a rock sample, a mineral sample, a combination thereof, and/or the like. Described herein are methods and systems for improved acoustic data and sample analysis. The present methods and systems provide improved analysis of acoustic data and samples using artificial intelligence and machine learning. A machine learning model, such as a segmentation model, may analyze an acoustic image(s) of a borehole from which a sample(s) has been extracted. The machine learning model may align an image(s) (referred to herein as a "sample image(s)") of the sample(s) with the acoustic image(s). For example, the machine learning model may use a segmentation model to classify each pixel of a plurality of pixels of the sample image(s) as corresponding to or not corresponding to a particular pixel(s) of the acoustic image(s). As another example, the machine learning model may use the segmentation model to classify each pixel of a plurality of pixels of the acoustic image(s) as corresponding to or not corresponding to a particular pixel(s) of the sample image(s). Thus, the segmentation model may align the sample image(s) with the acoustic image(s)—or vice-versa.

The acoustic image(s) may be captured using an imaging device, such as an acoustic logging instrument/televiewer, a camera, an optical televiewer, a combination thereof, and/or the like. The imaging device may be situated within the borehole from which a sample(s) has been extracted. The imaging device may capture orientation data associated with the borehole. The orientation data may be indicative of an orientation, a depth, etc., of the sample within the borehole. The machine learning model (e.g., the segmentation model) may align the sample image(s) with the acoustic image(s) without relying on the orientation data and/or the depth of the sample within the borehole. Once the sample image(s) and the acoustic image(s) are aligned, the orientation data may be used to determine an orientation of the sample image(s) within the borehole. For example, the orientation data may indicate an orientation for each pixel(s)/portion of the acoustic image. Based on the alignment of the sample image(s) with the acoustic image(s), the orientation of the sample image(s) may be determined.

A virtual orientation line may be overlain on the sample image(s). For example, the orientation of the sample image(s) may be used to generate the virtual orientation line. An output image may be generated. The output image may comprise the sample and the virtual orientation line. In some examples, structural data associated with the sample may be determined. The structural data may comprise one or more physical features associated with the sample. The one or more physical features may comprise an edge, a fracture, a broken zone, a bedding, or a vein, etc. For example, the segmentation model may determine the structural data. The output image may be displayed (e.g., provided) at a user interface. The user interface may be used to interact with the output image. For example, the user interface may enable a user to modify, edit, save, and/or send the output image.

Turning now to FIG. 1A, an example system 100 for improved acoustic data and sample analysis 100 is shown. The system 100 may include a job/excavation site 102 having a computing device(s), such as one or more imaging devices, capable of generating a plurality of sample images 109 depicting one or more of a plurality of samples. For example, the plurality of sample images 109 may each depict a sample (or a portion(s) thereof) within an apparatus, such as a core box. The computing device(s) at the job/excavation site 102 may provide (e.g., upload) the plurality of sample images 109 to a server 104 via a network. The computing device(s) at the job/excavation site 102 (or another computing device—not shown) may send survey/excavation data 103 associated with the plurality of samples to a computing device 106 and/or the server 104. The survey/excavation data 103 may comprise acoustic data and/or optical data associated with the plurality of samples and a corresponding borehole(s) from which the plurality of samples were extracted.

The network may facilitate communication between each device/entity of the system 100. The network may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent/received via the network by any device/entity of the system 100 via a variety of transmission paths, including wireless paths (e.g., satellite paths, Wi-Fi paths, cellular paths, etc.) and terrestrial paths (e.g., wired paths, a direct feed source via a direct line, etc.).

The server 104 may be a single computing device or a plurality of computing devices. For purposes of explanation, the description herein will describe the server 104 and the computing device 106 as being separate entities with separate functions. However, it is to be understood that any data sent/received by, as well as any functions performed by, the server 104 may apply equally to the computing device 106—and vice-versa. For example, the server 104 may be a module/component of the computing device 106—or vice-versa. Additionally, a third computing device (or more—not shown) may perform part of the functions described herein with respect to the system 100.

As shown in FIG. 1A, the server may include a storage module 104A and a machine learning module 104B. The computing device 106 may be in communication with the server 104 and/or the computing device(s) at the job/excavation site 102. For purposes of explanation, the description herein will refer to the server 104—specifically, the machine learning module 104B—as the device that analyzes the plurality of sample images 109 and the survey/excavation data 103; however, is to be understood that the computing device 106 may analyze the plurality of sample images 109 and/or the survey/excavation data 103 in a similar manner.

As described herein, the computing device(s) at the job/excavation site 102 may send (e.g., upload) the plurality of sample images 109 and the survey/excavation data 103 to the server 104 via the network. The machine learning module 104B of the server 104 may analyze the plurality of sample images 109 and the survey/excavation data 103. The survey/excavation data 103 may comprise acoustic data. The acoustic data may be generated at the job/excavation site 102. For example, the acoustic data may comprise acoustic images received by—or captured by—an imaging device, such as acoustic logging instrument, an acoustic scanner, an acoustic televiewer, a camera, an optical televiewer, a combination thereof, and/or the like.

The machine learning module 104B may use, as an example, a segmentation model to align the plurality of sample images 109 with the acoustic image(s). For example, the machine learning model may use a segmentation model to classify each pixel of a plurality of pixels of the plurality of sample images 109 as corresponding to or not corresponding to a particular pixel(s) of the acoustic image(s). As another example, the machine learning module 104B may use the segmentation model to classify each pixel of a plurality of pixels of the acoustic image(s) as corresponding to or not corresponding to a particular pixel(s) of the plurality of sample images 109. Thus, the segmentation model may align the plurality of sample images 109 with the acoustic image(s)—or vice-versa.

The survey/excavation data 103 may comprise orientation data. For example, the imaging device may capture orientation data associated with the borehole. The orientation data may be indicative of an orientation, a depth, etc., of the samples within the borehole. The orientation data may be indicative of one or more sine waves, strike angles, dip angles, an azimuth, etc. associated with each sample depicted in the plurality of sample images 109. Once the plurality of sample images 109 and the acoustic image(s) are aligned, the orientation data may be used to determine an orientation for each corresponding sample of the plurality of sample images 109. For example, the orientation data may indicate an orientation for each pixel(s)/portion of the acoustic images. Based on the alignment of the plurality of sample images 109 with the acoustic image(s), the orientation of the corresponding samples may be determined. A virtual orientation line may be overlain on each of the plurality of sample images 109.

The segmentation model may be trained, as further discussed herein, by applying one or more machine learning models and/or algorithms to a plurality of training sample images and acoustic images associated with a plurality of training samples. The term "segmentation" refers to analysis of an image(s) of the plurality of sample images 109 and/or acoustic images to determine related areas of the image(s). In some cases, segmentation may be based on semantic content of the image(s). For example, segmentation analysis performed on the image(s) may indicate a region of the image(s) depicting a particular attribute(s) of the corresponding sample. In some cases, segmentation analysis may produce segmentation data. The segmentation data may indicate one or more segmented regions of the analyzed image(s). For example, the segmentation data may include a set of labels, such as pairwise labels (e.g., labels having a value indicating "yes" or "no") indicating whether a given pixel in the image(s) is part of a region depicting a particular attribute(s) of the corresponding sample. In some cases, labels may have multiple available values, such as a set of labels indicating whether a given pixel depicts a first attribute, a second attribute, a combination of attributes, and so on. The segmentation data may include numerical data, such as data indicating a probability that a given pixel is a region depicting a particular attribute(s) of the corresponding sample. In some cases, the segmentation data may include additional types of data, such as text, database records, or additional data types, or structures.

Figure 1B:
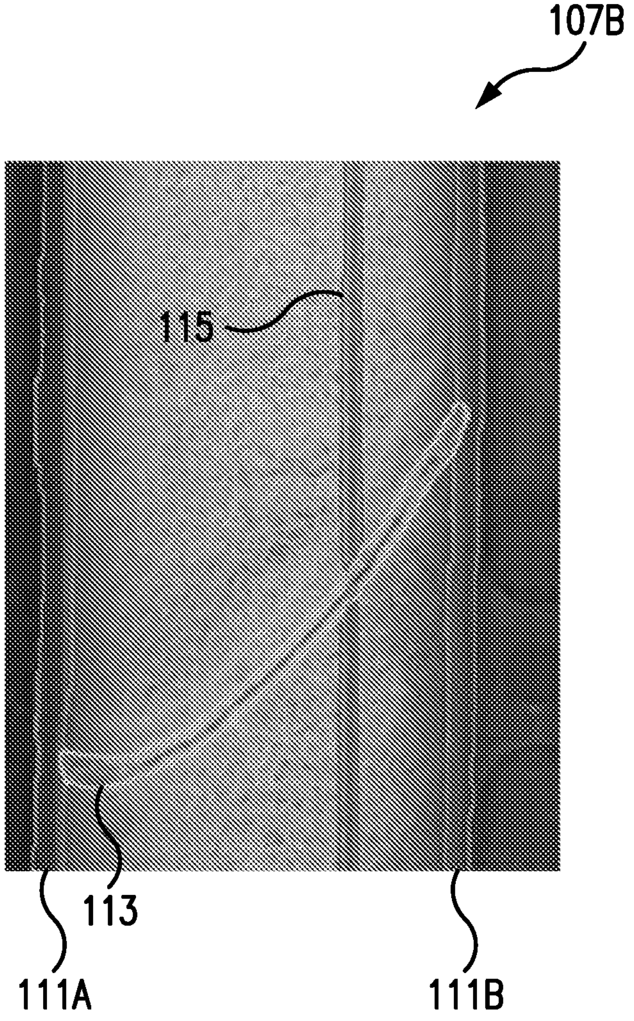
FIG. 1B shows an example sample image.

In some examples, structural data associated with the sample may be determined. The structural data may comprise—or be indicative of—one or more physical features associated with the sample. The one or more physical features may comprise an edge, a fracture, a broken zone, a bedding, or a vein, etc. For example, the segmentation model may determine the structural data. As shown in FIG. 1A, the storage module 104A may provide/send a first sample image 107A of the plurality of sample images 109 to the machine learning module 104B. The machine learning module 104B may use the segmentation model to align the first sample image 107A with a corresponding acoustic image. The machine learning module 104B may generate an output image 107B indicative of the virtual orientation line described herein. For example, as shown in FIG. 1B, the machine learning module 104B may overlay the virtual orientation line on the output image 107B as an orientation line 115. In some examples, the orientation line 115 may comprise a solid line (e.g., as shown in FIG. 1B) to indicate the orientation line 115 is associated with a portion of the sample that is visible in the output image 107B (e.g., a portion facing "outwards" toward the viewer). In other examples, the orientation line 115 may comprise a dashed line or a semi-transparent line (not shown in FIG. 1B) to indicate the orientation line 115 is associated with a portion of the sample that is not visible (or only partially visible) in the output image 107B (e.g., a portion facing "inwards" away the viewer).

Figure 1C:
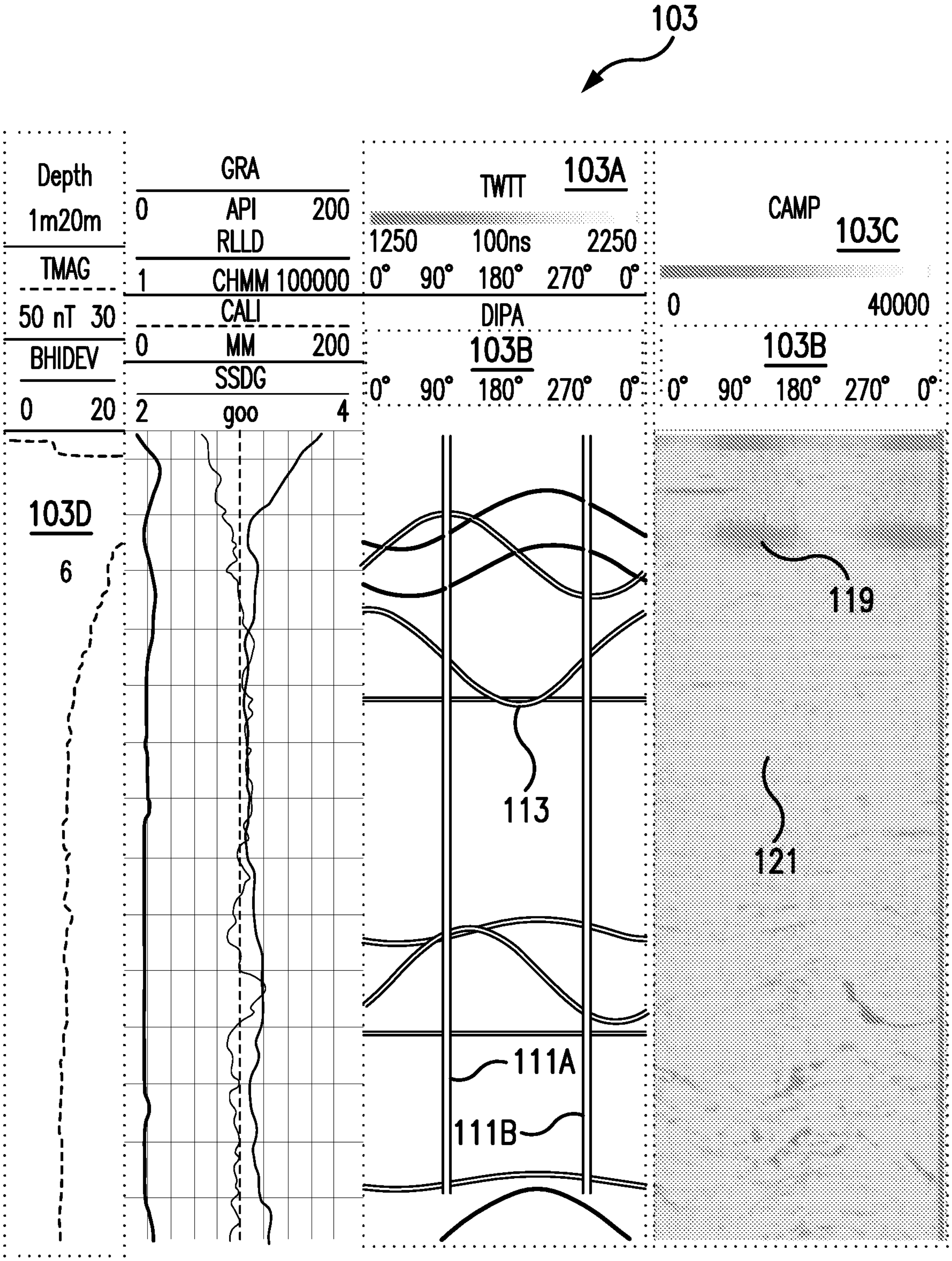
FIG. 1C shows example acoustic data.

The survey/excavation data 103 may comprise a two-way travel time image 103A and/or an amplitude image 103C, as shown in FIG. 1C, based on the acoustic data provided by the imaging device (e.g., an acoustic logging instrument). The two-way travel time image 103A and the amplitude image 103C may correspond to the sample depicted in the first sample image 107A. For example, the two-way travel time image 103A and the amplitude image 103C may comprise—or be indicative of—acoustic data and/or optical data associated with the borehole(s) from which the sample depicted in the first sample image 107A was extracted.

As discussed above, the structural data may comprise—or be indicative of—one or more physical features associated with a sample(s). In some examples, the two-way travel time image 103A and the amplitude image 103C may be used to determine the structural data. The two-way travel time image 103A may be indicative of one or more sine waves, strike angles, dip angles, etc. associated with one or more attributes of the one or more physical features. For example, the acoustic logging instrument may be situated within the borehole from which the plurality of samples were extracted. The two-way travel time image 103A may be representative of a caliper curve, which may be based on a travel time for one or more acoustic pulses emitted by the acoustic logging instrument within the borehole. The travel time for the one or more acoustic pulses may comprise a quantity of time for the one or more acoustic pulses to travel from the acoustic logging instrument to a wall of the borehole and back. The two-way travel time image 103A may comprise a plurality of pixels and an acoustic data model of the machine learning module 104 may classify each pixel as either being indicative of or not being indicative of each of the one or more physical features. The amplitude image 103C may be indicative of a strength of a reflection of the one or more acoustic pulses off a wall of the borehole. The amplitude image 103C may comprise a plurality of pixels where lighter colored pixels, such as pixels 121, may be indicative of a hard physical material (e.g., rock) while darker colored pixels, such as pixels 119, may be indicative of a soft physical material (e.g., fluid, air, etc.). Additionally, pixels having a particular color/shade/saturation, such as pixels 121, may be indicative of a particular type of material/composition (e.g., a particular type of rock(s)/composition of rock(s)), while pixels of another color/shade/saturation, such as pixels 119, may be indicative of another type of material/composition (e.g., another type of rock(s)/composition of rock(s)).

The one or more physical features may be determined by the machine learning module 104B based on the two-way travel time image 103A and/or the amplitude image 103C. For example, the acoustic data model may use segmentation algorithms when analyzing the acoustic data in a similar manner as the segmentation model with respect to the plurality of sample images 109. The acoustic data model may determine a region of the two-way travel time image 103A and/or the amplitude image 103C depicting a particular attribute(s) of the sample depicted in the first sample image 107A. In some cases, analysis may produce acoustic segmentation data. The acoustic segmentation data may indicate one or more segmented regions of the two-way travel time image 103A and/or the amplitude image 103C. For example, the acoustic segmentation data may include a set of labels, such as pairwise labels (e.g., labels having a value indicating "yes" or "no") indicating whether a given pixel in the two-way travel time image 103A and/or the amplitude image 103C is part of a region depicting a particular attribute(s) of the corresponding sample. In some cases, labels may have multiple available values, such as a set of labels indicating whether a given pixel depicts a first attribute, a second attribute, a combination of attributes, and so on (e.g., one or more of the second plurality of attributers). The acoustic segmentation data may include numerical data, such as data indicating a probability that a given pixel is a region depicting a particular attribute(s) of the corresponding sample. In some cases, the acoustic segmentation data may include additional types of data, such as text, database records, or additional data types, or structures.

The machine learning module 104B may use the acoustic data model to classify each pixel of each of the two-way travel time image 103A and/or the amplitude image 103C to determine which pixels are indicative of each of the one or more physical features. For example, the acoustic data model may classify a number of pixels of the two-way travel time image 103A as being indicative of (e.g., depicting a portion of) a fracture of the corresponding sample. The fracture indicated by the two-way travel time image 103A may correspond to a fracture of the sample, such as the fracture 113 shown in FIG. 1B. The acoustic segmentation data may be further indicative of a depth level 103D associated with each pixel/portion of the two-way travel time image 103A and/or the amplitude image 103C as well as orientation data with respect to gravity (e.g., a gravity toolface ("GTF") range). For example, the two-way travel time image 103A and the amplitude image 103C may each indicate a GTF range 103B corresponding to each pixel/feature. The GTF range 103B may indicate a direction of gravity acting upon the sample at each corresponding location of each of the second plurality of attributes (e.g., at each fracture, each bedding, each vein, etc.) with respect to a high side of the borehole. The GTF range 103B may be determined by the acoustic logging instrument using a multi-axis magnetometer and/or a multi-axis accelerometer that indicate a direction/value of a gravity vector. The acoustic data model may associate a corresponding depth level 103D and/or an orientation (e.g., a GTF range/value) with each pixel/feature shown in the two-way travel time image 103A and/or the amplitude image 103C. The acoustic data model may therefore associate the depth level 103D and/or the orientation associated with each pixel/feature shown in the two-way travel time image 103A and/or the amplitude image 103C with each of the one or more physical features.

The machine learning module 104B may send the output image 107B to the storage module 104A. The storage module 104A may send the output image 107B to the computing device 106. The computing device 106 may receive the output image 107B via the application, which may be displayed via a user interface of the application at the computing device 106. A user of the application may interact with the output image 107B and provide one or more user edits, such as by adjusting an attribute/feature, modifying an attribute/feature, drawing a position for a new attribute/feature, etc. The application may provide an indication 107C of the one or more user edits to the server 104 (e.g., an edited version of the output image 107B). The indication 107C of the one or more user edits may be stored at the storage module 104A.

Figure 1D:
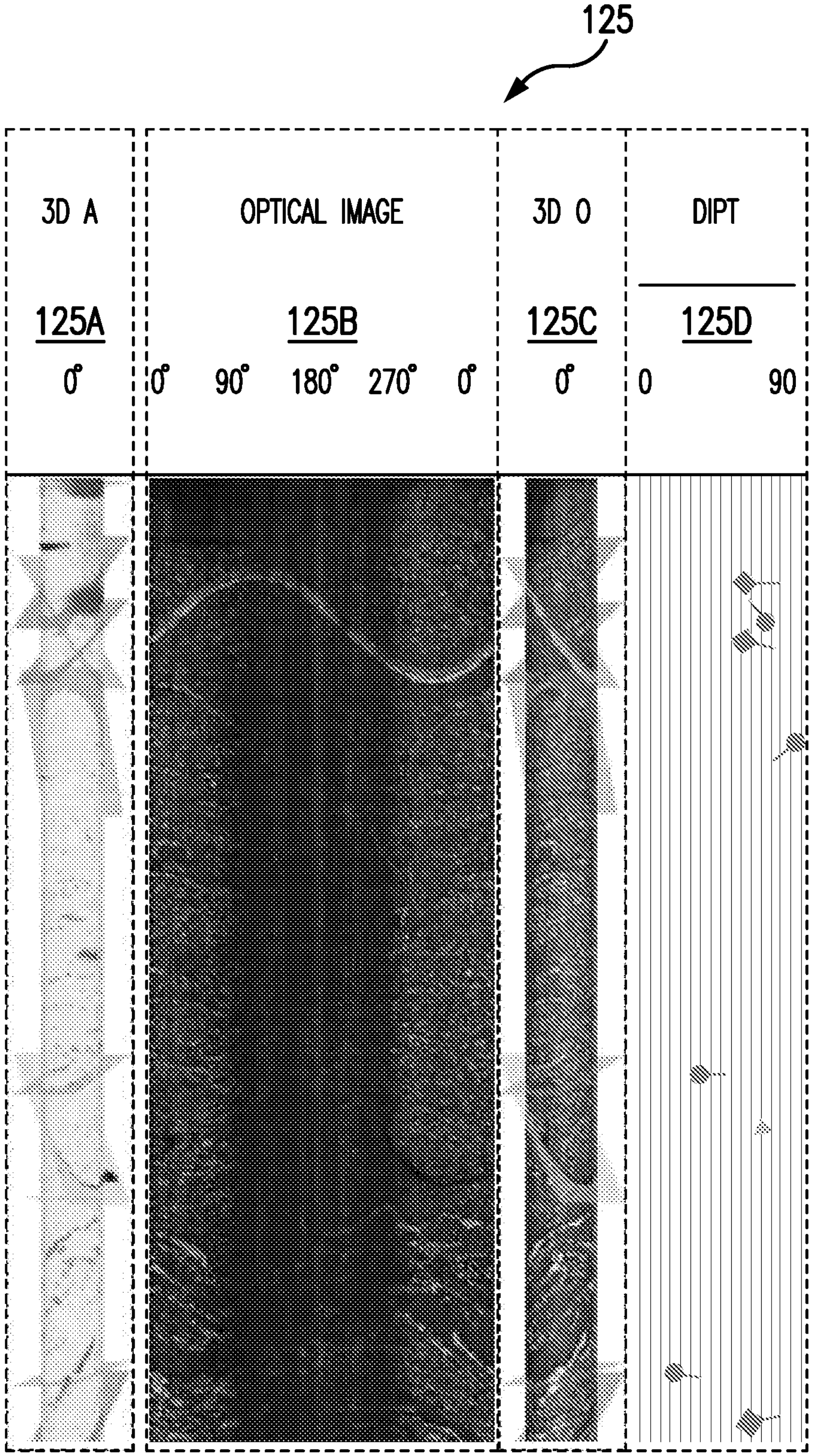
FIG. 1D shows an example plurality of output images.

As discussed herein, an imaging device, such as a camera, optical televiewer, etc. (not shown), may capture one or more images of the borehole(s) from which the plurality of samples were extracted. The server 104 may generate a plurality of second output images 125 as shown in FIG. 1D based on the one or more images of the borehole(s). For example, the server 104 may generate the plurality of second output images 125 based on the acoustic data derived from the survey/excavation data 103 and the segmentation data derived from the semantic content of the plurality of sample images 109. That is, the server 104 may generate the plurality of second output images 125 by aligning the one or more images of the borehole(s) with the output image 107B. The plurality of second output images 125 may comprise an acoustic three-dimensional image 125A of the borehole(s), a two-dimensional optical image 125B of the borehole(s), an optical three-dimensional image 125C of the borehole(s), and a depth indicator 125D corresponding to each of the plurality of second output images 125. The server 104 may save/store the plurality of second output images 125 in the storage module 104A. The server 104 may send the plurality of second output images 125 to the computing device 106.

Figure 2:
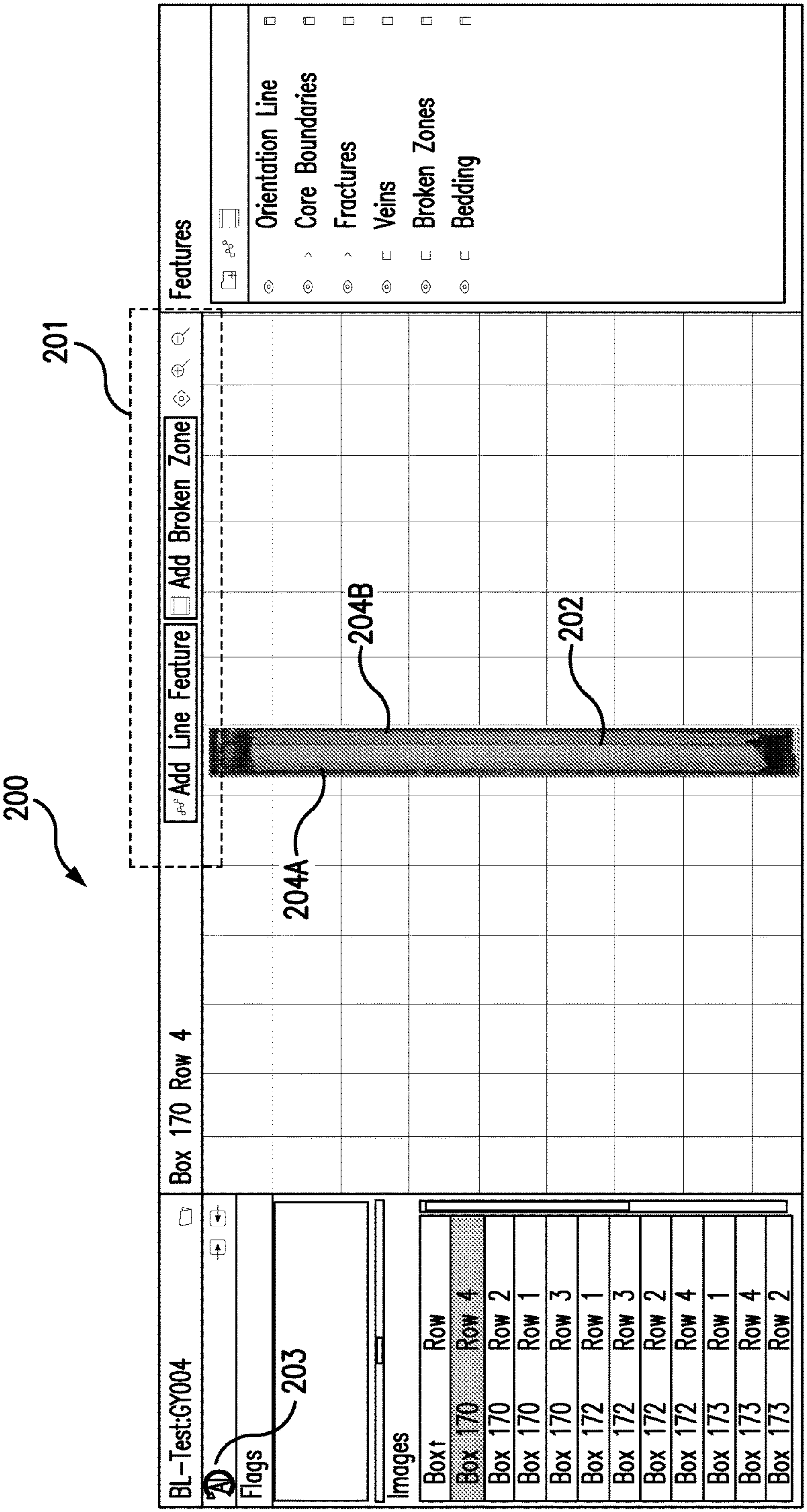
FIGS. 2-6 show example user interfaces.

FIG. 2 shows an example first view 200 of a user interface of the application executing on the computing device 106. As shown in FIG. 2, the first view 200 of the user interface may include the output image 107B. A segmentation mask (e.g., a digital overlay) shown in FIG. 2 indicates an orientation line 202 (e.g., the orientation line 115) as well as boundaries 204A and 204B (e.g., such as edges 111A and 111B as shown in FIG. 1B). The orientation line 202 may comprise a line formed through an intersection of a vertical plane and an edge of the sample where the vertical plane passes through an axis of the sample. The orientation line 202 may be a line that is parallel to the axis of the sample, representing a bottom most point—or a top most point—of the sample. As described herein, the user interface may include a plurality of editing tools 201 that facilitate a user interacting with the output image and/or the segmentation mask for a sample. The user may revert to the output image as originally shown via a button 203.

Figure 3:
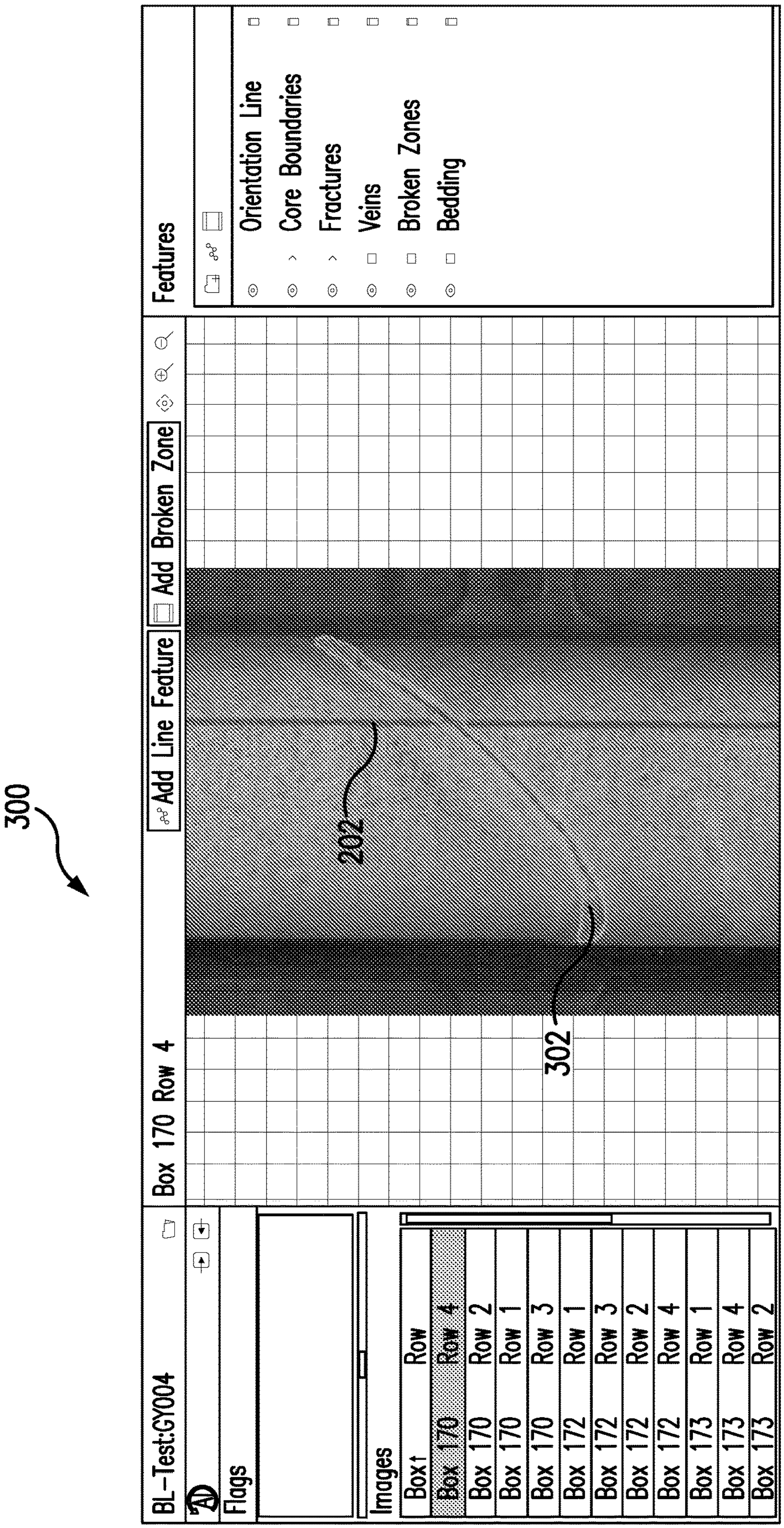

FIG. 3 shows an example second view 300 of the user interface. As shown in FIG. 3, the second view 300 of the user interface may include an output image (e.g., the output image 107B) containing an image of a sample and one or more attributes associated with the sample, such as the orientation line 202 of the sample as well a fracture 302 (e.g., the fracture 113) of the sample. The one or more attributes may be provided in the output image via the segmentation mask. The fracture 302 may be any physical break or separation in the sample that is caused by (e.g., formed by) natural means (e.g., faults, joints, etc.) or artificial means (e.g., mechanical breaks due to drilling, etc.).

Figure 4:
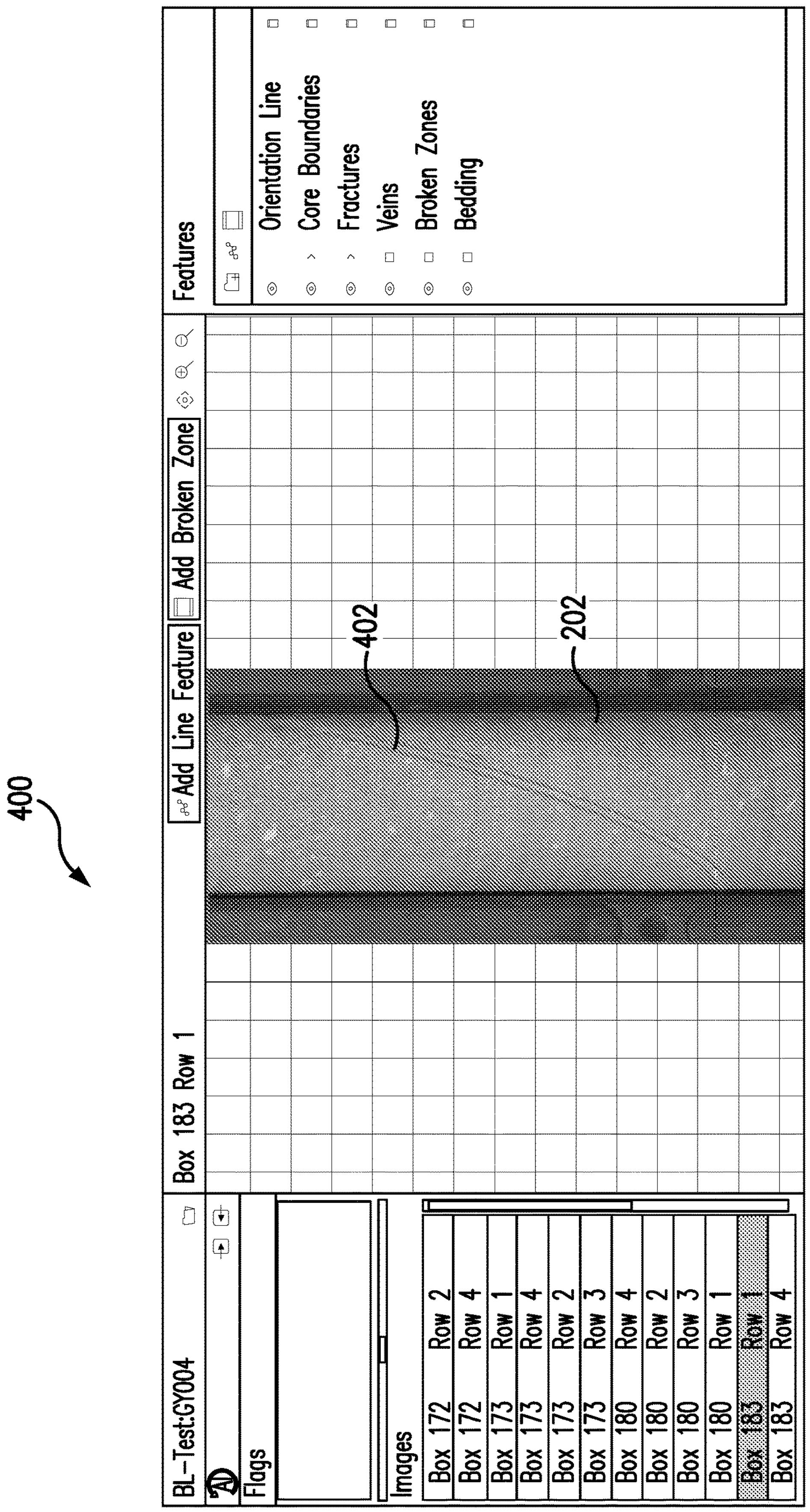

FIG. 4 shows an example third view 400 of the user interface. As shown in FIG. 4, the third view 400 of the user interface may include an output image (e.g., the output image 107B) containing an image of a sample and one or more attributes associated with the sample, such as the orientation line 202 of the sample as well a vein 402 within the sample. The one or more attributes may be provided in the output image via the segmentation mask. The vein 402 may be any sheet-like body of a mineral or mineral assemblage that is distinct either compositionally or texturally within the sample.

Figure 5:
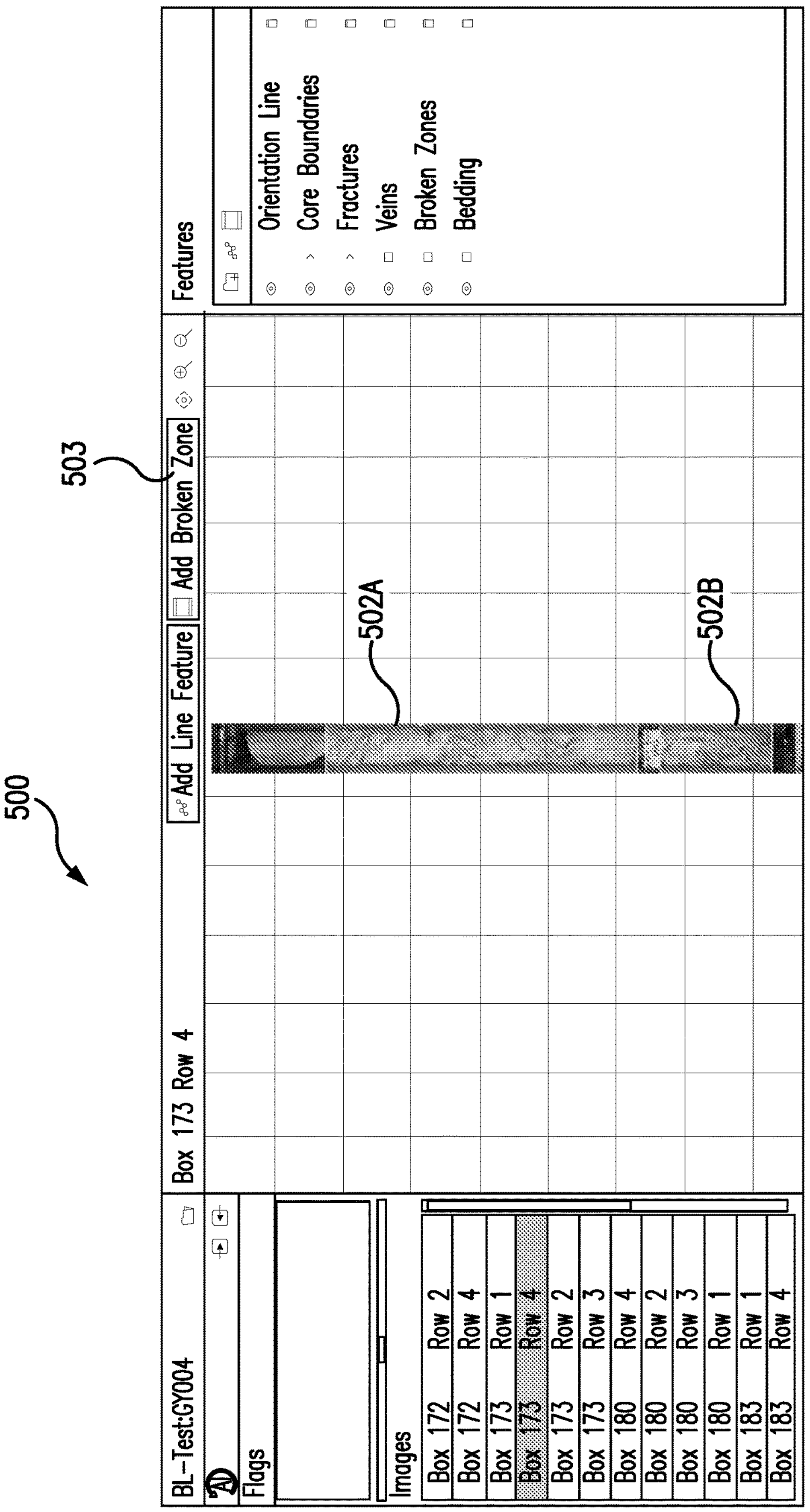

FIG. 5 shows an example fourth view 500 of the user interface. As shown in FIG. 5, the fourth view 500 of the user interface may include an output image (e.g., the output image 107B) containing an image of a sample and one or more attributes associated with the sample, such as a first broken zone 502A and a second broken zone 502B. The one or more attributes may be provided in the output image via the segmentation mask. Each of the first broken zone 502A and the second broken zone 502B may be an area of the sample that is sufficiently broken up into multiple pieces. Each of the first broken zone 502A and the second broken zone 502B may be determined by the segmentation model and/or the acoustic data model. For example, the segmentation model and/or the acoustic data model may determine that a plurality of pixels in the sample image of the plurality of sample images 109 and/or the survey/excavation data 103 corresponding to the output image shown in FIG. 5 comprises at least two portions of the sample and a non-rock material situated at least partially between the at least two portions of the sample.

Figure 6:
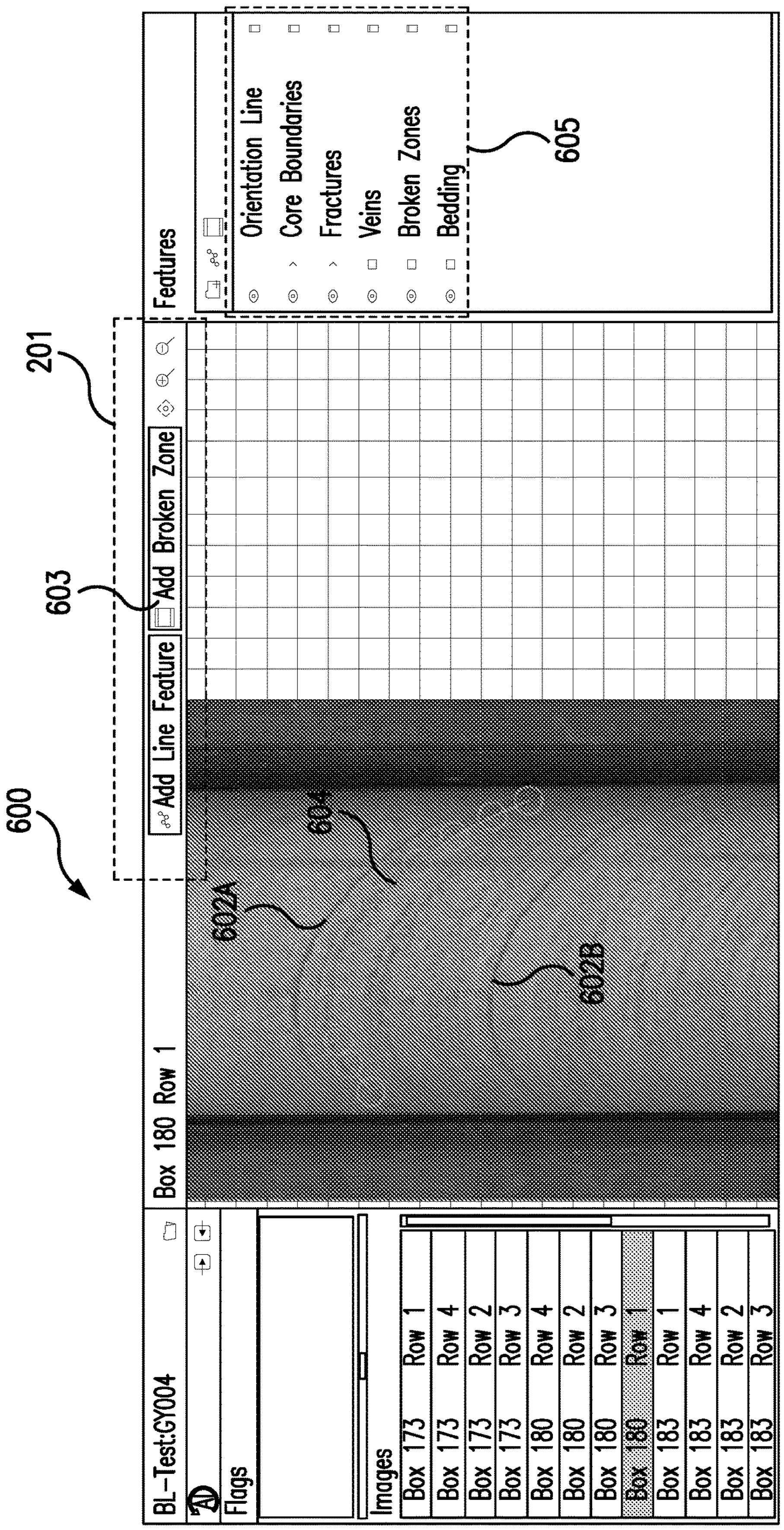

FIG. 6 shows an example fifth view 600 of the user interface. As shown in FIG. 6, the fifth view 600 of the user interface may include an output image (e.g., the output image 107B) containing an image of a sample and one or more physical features/attributes associated with the sample, such as a first bedding 602A and a second bedding 602B. The one or more physical features/attributes may be provided in the output image via the segmentation mask. FIG. 6. Each of the first bedding 602A and the second bedding 602B may be layers of sedimentary rock within the sample that are distinct either compositionally or texturally from underlying and/or overlying rock within the sample.

As described herein, the user interface may include a plurality of editing tools 201 that facilitate the user interacting with the output image and/or the segmentation mask for a sample. The user may interact with the output image and/or the segmentation mask and provide one or more user edits, such as by adjusting an attribute (e.g., an indication of a physical feature), modifying an attribute, drawing a position for a new attribute, etc. For example, as shown in FIG. 6, a first tool 603 of the plurality of tools 201 may allow the user to create a user-defined attribute associated with the sample by drawing a line over a portion of the output image. As shown in FIG. 6, the first tool 603 may allow the user to draw a user-defined attribute 604. The user interface may include a list of attribute categories 605 that allow the user to categorize the user-defined attribute 604. In the example shown in FIG. 6, the user-defined attribute 604 is an additional bedding; however, any category of user-defined attribute may be added using the plurality of tools 201. The user may also modify and/or delete any attribute indicated by the segmentation mask.

The application may provide an indication of one or more user edits made to any of the attributes indicated by the segmentation mask (or any created or deleted attributes) to the server 104. For example, as shown in FIG. 1, the application may send the indication 107C of the one or more user edits (e.g., an edited version of the output image 107B) to the server 104. Expert annotation may be provided to the server 104 by a third-party computing device (not shown). The expert annotation may be associated with the one or more user edits. For example, the expert annotation may comprise an indication of an acceptance of the one or more user edits, a rejection of the one or more user edits, or an adjustment to the one or more user edits. The one or more user edits and/or the expert annotation may be used by the machine learning module 104B to optimize the segmentation model and/or the acoustic data model. For example, the one or more user edits and/or the expert annotation may be used by the machine learning module 104B to retrain the segmentation model and/or the acoustic data model.

Figure 7:
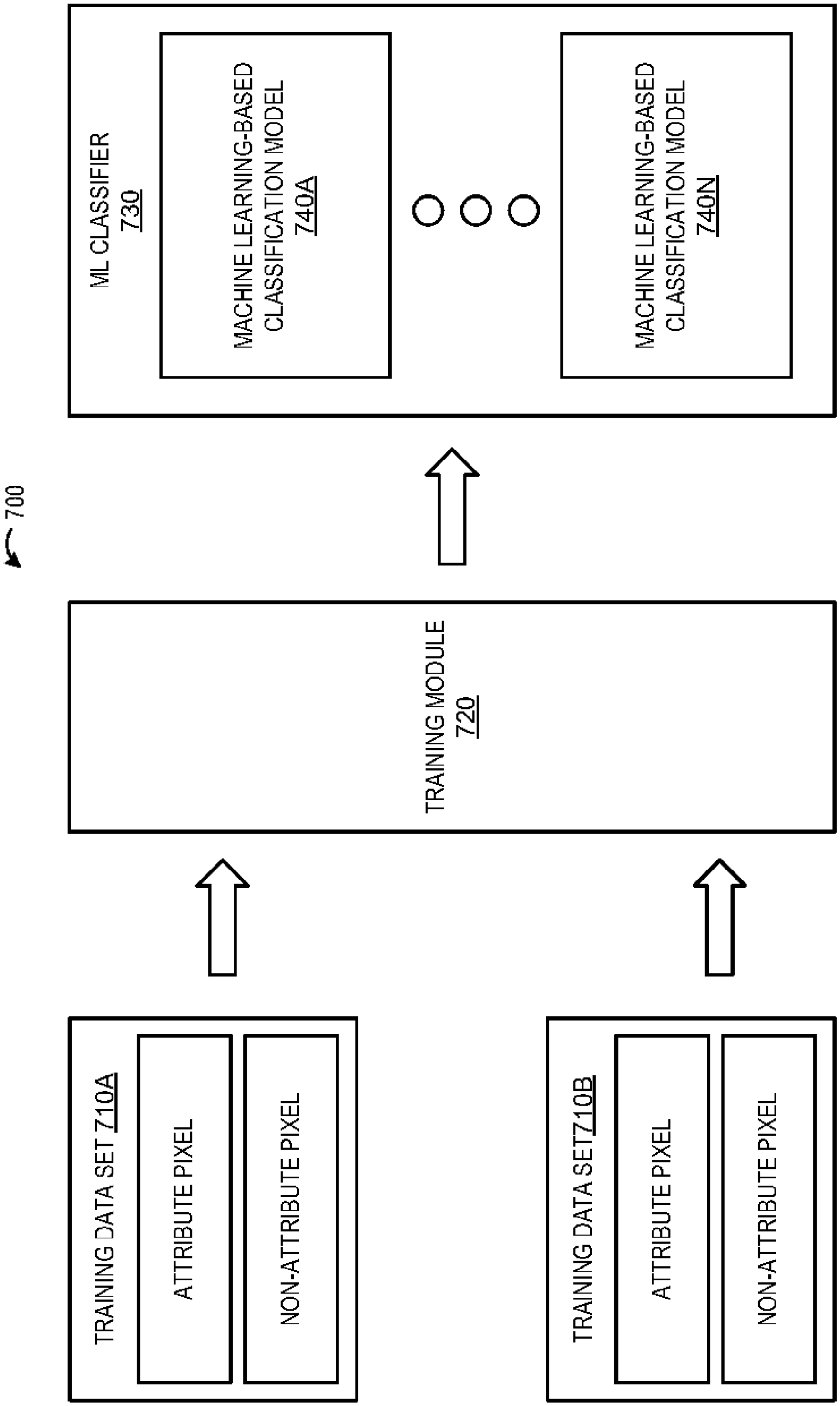
FIG. 7 shows an example system.

Turning now to FIG. 7, a system 700 is shown. The system 700 may be configured to use machine learning techniques to train, based on an analysis of one or more training data sets 710A-710B by a training module 720, at least one machine learning-based classifier 730 that is configured to classify pixels in a sample image as depicting or not depicting a particular attribute(s) of a corresponding sample. The at least one machine learning-based classifier 730 may comprise the machine learning module 104B (e.g., a segmentation model and/or an acoustic data model).

The system 700 may determine (e.g., access, receive, retrieve, etc.) the training data set 710A. The training data set 710A may comprise first sample images (e.g., a portion of the plurality of sample images 109) and first acoustic images (e.g., a portion of the survey/excavation data 103) associated with a plurality of samples (e.g., first samples).

The system 700 may determine (e.g., access, receive, retrieve, etc.) the training data set 710B. The training data set 710B may comprise second sample images (e.g., a portion of the plurality of sample images 109) and second acoustic images (e.g., a portion of the survey/excavation data 103) associated with the plurality of samples (e.g., second samples). The first samples and the second samples may each contain one or more imaging result datasets associated with sample images, and each imaging result dataset may be associated with one or more pixel attributes. The one or more pixel attributes may include a level of color saturation, a hue, a contrast level, a relative position, a combination thereof, and/or the like. Each imaging result dataset may include a labeled list of imaging results. The labels may comprise "attribute pixel" and "non-attribute pixel."

Sample images and acoustic data images may be randomly assigned to the training data set 710B or to a testing data set. In some implementations, the assignment of data to a training data set or a testing data set may not be completely random. In this case, one or more criteria may be used during the assignment, such as ensuring that similar numbers of sample images and acoustic images with different labels are in each of the training and testing data sets. In general, any suitable method may be used to assign the data to the training or testing data sets, while ensuring that the distributions of sufficient quality and insufficient quality labels are somewhat similar in the training data set and the testing data set.

The training module 720 may train the machine learning-based classifier 730 by extracting a feature set from the training data set 710A according to one or more feature selection techniques. The training module 720 may further define the feature set obtained from the training data set 710A by applying one or more feature selection techniques to the training data set 710B that includes statistically significant features of positive examples (e.g., pixels depicting a particular attribute(s) of a corresponding sample) and statistically significant features of negative examples (e.g., pixels not depicting a particular attribute(s) of a corresponding sample). The feature set extracted from the training data set 710A and/or the training dataset 710B may comprise segmentation data and/or acoustic imaging data as described herein. For example, the feature set may comprise features associated with pixels that are indicative of the one or more physical features described herein. The feature set may be derived from the segmentation data indicated by the plurality of sample images 109 and/or the acoustic imaging data indicated by the two-way travel time image 103A and/or the amplitude image 103C.

The training module 720 may extract the feature set from the training data set 710A and/or the training data set 710B in a variety of ways. The training module 720 may perform feature extraction multiple times, each time using a different feature-extraction technique. In an embodiment, the feature sets generated using the different techniques may each be used to generate different machine learning-based classification models 740. For example, the feature set with the highest quality metrics may be selected for use in training. The training module 720 may use the feature set(s) to build one or more machine learning-based classification models 740A-740N that are configured to indicate whether or not new sample images/acoustic images contain or do not contain pixels depicting a particular attribute(s) of the corresponding samples.

The training data set 710A and/or the training data set 710B may be analyzed to determine any dependencies, associations, and/or correlations between extracted features and the sufficient quality/insufficient quality labels in the training data set 710A and/or the training data set 710B. The identified correlations may have the form of a list of features that are associated with labels for pixels depicting a particular attribute(s) of a corresponding sample and labels for pixels not depicting the particular attribute(s) of the corresponding sample. The features may be considered as variables in the machine learning context. The term "feature," as used herein, may refer to any characteristic of an item of data that may be used to determine whether the item of data falls within one or more specific categories. By way of example, the features described herein may comprise the one or more pixel attributes. The one or more pixel attributes may include a level of color saturation, a hue, a contrast level, a relative position, a combination thereof, and/or the like.

A feature selection technique may comprise one or more feature selection rules. The one or more feature selection rules may comprise a pixel attribute and a pixel attribute occurrence rule. The pixel attribute occurrence rule may comprise determining which pixel attributes in the training data set 710A occur over a threshold number of times and identifying those pixel attributes that satisfy the threshold as candidate features. For example, any pixel attributes that appear greater than or equal to 8 times in the training data set 710A may be considered as candidate features. Any pixel attributes appearing less than 8 times may be excluded from consideration as a feature. Any threshold amount may be used as needed.

A single feature selection rule may be applied to select features or multiple feature selection rules may be applied to select features. The feature selection rules may be applied in a cascading fashion, with the feature selection rules being applied in a specific order and applied to the results of the previous rule. For example, the pixel attribute occurrence rule may be applied to the training data set 710A to generate a first list of pixel attributes. A final list of candidate features may be analyzed according to additional feature selection techniques to determine one or more candidate groups (e.g., groups of pixel attributes). Any suitable computational technique may be used to identify the candidate feature groups using any feature selection technique such as filter, wrapper, and/or embedded methods. One or more candidate feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms. Instead, features may be selected on the basis of scores in various statistical tests for their correlation with the outcome variable (e.g., pixels that depict or do not depict a particular attribute(s) of a corresponding sample).

As another example, one or more candidate feature groups may be selected according to a wrapper method. A wrapper method may be configured to use a subset of features and train a machine learning model using the subset of features. Based on the inferences that drawn from a previous model, features may be added and/or deleted from the subset. Wrapper methods include, for example, forward feature selection, backward feature elimination, recursive feature elimination, combinations thereof, and the like. In an embodiment, forward feature selection may be used to identify one or more candidate feature groups. Forward feature selection is an iterative method that begins with no features in the machine learning model. In each iteration, the feature which best improves the model is added until an addition of a new feature does not improve the performance of the machine learning model. In an embodiment, backward elimination may be used to identify one or more candidate feature groups. Backward elimination is an iterative method that begins with all features in the machine learning model. In each iteration, the least significant feature is removed until no improvement is observed on removal of features. Recursive feature elimination may be used to identify one or more candidate feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 720 has generated a feature set(s), the training module 720 may generate a machine learning-based classification model 740 based on the feature set(s). A machine learning-based classification model may refer to a complex mathematical model for data classification that is generated using machine-learning techniques. In one example, this machine learning-based classifier may include a map of support vectors that represent boundary features. By way of example, boundary features may be selected from, and/or represent the highest-ranked features in, a feature set.

The training module 720 may use the feature sets extracted from the training data set 710A and/or the training data set 710B to build a machine learning-based classification model 740A-740N for each classification category (e.g., each attribute of a corresponding sample). In some examples, the machine learning-based classification models 740A-740N may be combined into a single machine learning-based classification model 740. Similarly, the machine learning-based classifier 730 may represent a single classifier containing a single or a plurality of machine learning-based classification models 740 and/or multiple classifiers containing a single or a plurality of machine learning-based classification models 740.

The extracted features (e.g., one or more pixel attributes) may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multilayer perceptron (MLP) ANNs (e.g., for non-linear models); replicating reservoir networks (e.g., for non-linear models, typically for time series); random forest classification; a combination thereof and/or the like. The resulting machine learning-based classifier 730 may comprise a decision rule or a mapping for each candidate pixel attribute to assign a pixel(s) to a class (e.g., depicting or not depicting a particular attribute(s) of a corresponding sample).

The candidate pixel attributes and the machine learning-based classifier 730 may be used to predict a label (e.g., depicting or not depicting a particular attribute(s) of a corresponding sample) for imaging results in the testing data set (e.g., in a portion of second sample images/acoustic images). In one example, the prediction for each imaging result in the testing data set includes a confidence level that corresponds to a likelihood or a probability that the corresponding pixel(s) depicts or does not depict a particular attribute(s) of a corresponding sample. The confidence level may be a value between zero and one, and it may represent a likelihood that the corresponding pixel(s) belongs to a particular class. In one example, when there are two statuses (e.g., depicting or not depicting a particular attribute(s) of a corresponding sample), the confidence level may correspond to a value p, which refers to a likelihood that a particular pixel belongs to the first status (e.g., depicting the particular attribute(s)). In this case, the value $1-p$ may refer to a likelihood that the particular pixel belongs to the second status (e.g., not depicting the particular attribute(s)). In general, multiple confidence levels may be provided for each pixel and for each candidate pixel attribute when there are more than two statuses. A top performing candidate pixel attribute may be determined by comparing the result obtained for each pixel with the known sufficient quality/insufficient quality status for each corresponding sample image in the testing data set (e.g., by comparing the result obtained for each pixel with the labeled sample images of the second portion of the second sample images). In general, the top performing candidate pixel attribute for a particular attribute(s) of the corresponding sample will have results that closely match the known depicting/not depicting statuses.

The top performing pixel attribute may be used to predict the depicting/not depicting of pixels of a new sample image/acoustic image. For example, a new sample image/acoustic image may be determined/received. The new sample image/acoustic image may be provided to the machine learning-based classifier 730 which may, based on the top performing pixel attribute for the particular attribute(s) of the corresponding sample, classify the pixels of the new sample image/acoustic image as depicting or not depicting the particular attribute(s).

As noted above regarding FIG. 6, the application may provide an indication of one or more user edits made to any of the attributes indicated by the segmentation mask/overlay (or any created or deleted attributes) to the server 104 as the indication 107C (e.g., an edited version of the output image 107B). For example, the user may edit any of the attributes indicated by the segmentation mask/overlay by dragging some of its points to desired positions via mouse movements in order to optimally delineate depictions of boundaries of the attribute(s). As another example, the user may draw or redraw parts of the segmentation mask/overlay via a mouse. Other input devices or methods of obtaining user commands may also be used. The one or more user edits may be used by the machine learning module 104B to optimize the segmentation model and/or the acoustic data model. For example, the training module 720 may extract one or more features from output images containing one or more user edits as discussed above. The training module 720 may use the one or more features to retrain the machine learning-based classifier 730 and thereby continually improve results provided by the machine learning-based classifier 730.

Figure 8:
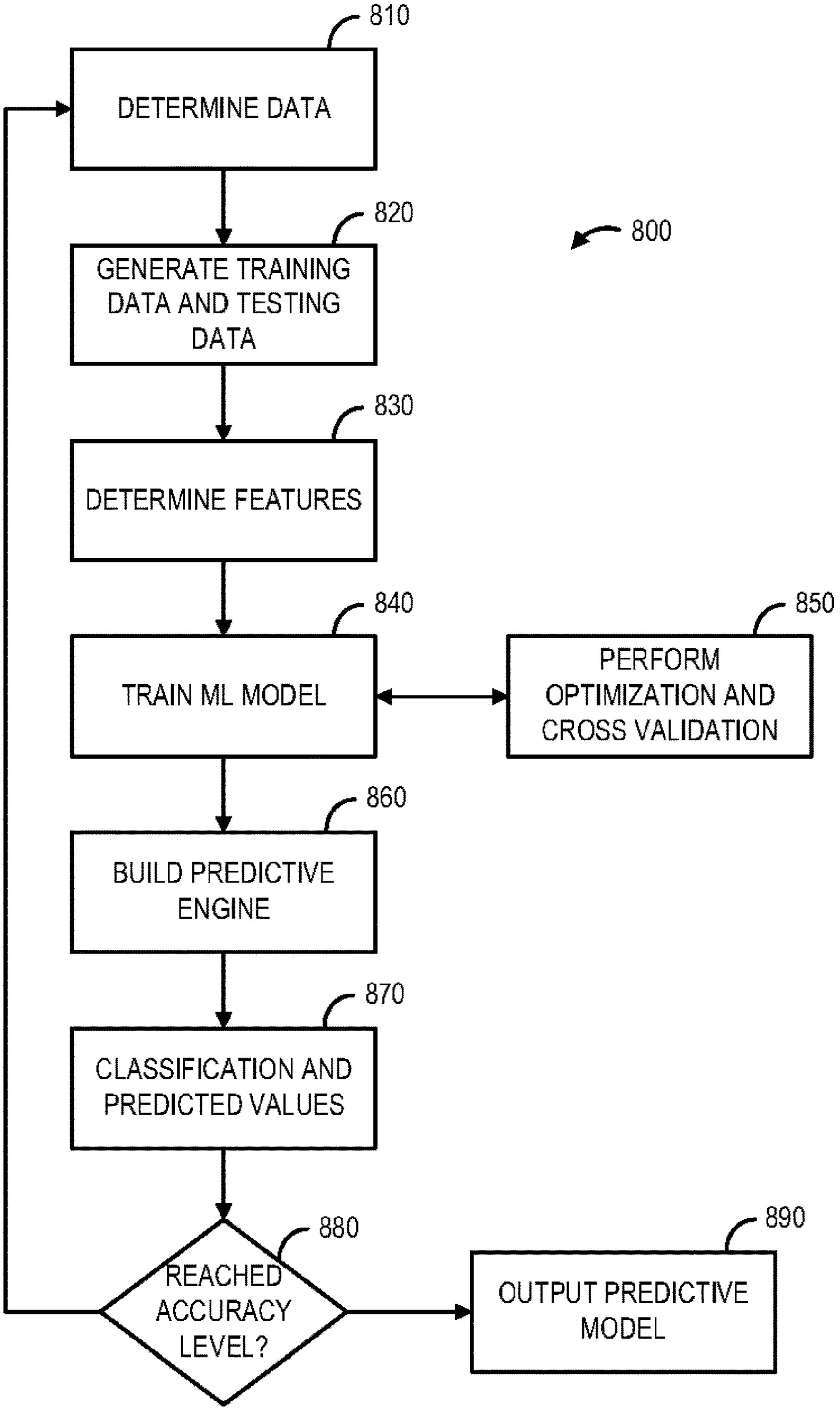
FIG. 8 shows an example process flowchart.

Turning now to FIG. 8, a flowchart illustrating an example training method 800 is shown. The method 800 may be used for generating the machine learning-based classifier 730 using the training module 720. The training module 720 can implement supervised, unsupervised, and/or semi-supervised (e.g., reinforcement based) machine learning-based classification models 740. The method 800 illustrated in FIG. 8 is an example of a supervised learning method; variations of this example of training method are discussed below, however, other training methods can be analogously implemented to train unsupervised and/or semi-supervised machine learning models.

The training method 800 may determine (e.g., access, receive, retrieve, etc.) first sample images and first acoustic images associated with a plurality of samples (e.g., first samples) and second sample images and second acoustic images associated with the plurality of samples (e.g., second samples) at step 810. The first samples and the second samples may each contain one or more imaging result datasets associated with sample images, and each imaging result dataset may be associated with one or more pixel attributes. The one or more pixel attributes may include a level of color saturation, a hue, a contrast level, a relative position, a combination thereof, and/or the like. Each imaging result dataset may include a labeled list of imaging results. The labels may comprise "attribute pixel" and "non-attribute pixel."

The training method 800 may generate, at step 820, a training data set and a testing data set. The training data set and the testing data set may be generated by randomly assigning labeled imaging results from the sample images to either the training data set or the testing data set. In some implementations, the assignment of labeled imaging results as training or test samples may not be completely random. In an embodiment, only the labeled imaging results for a specific sample type and/or class (e.g., samples having a particular physical feature) may be used to generate the training data set and the testing data set. In an embodiment, a majority of the labeled imaging results for the specific sample type and/or class may be used to generate the training data set. For example, 75% of the labeled imaging results for the specific sample type and/or class may be used to generate the training data set and 25% may be used to generate the testing data set.

The training method 800 may determine (e.g., extract, select, etc.), at step 830, one or more features that can be used by, for example, a classifier to differentiate among different classifications (e.g., "attribute pixel" vs. "non-attribute pixel."). The one or more features may comprise a set of one or more pixel attributes. The one or more pixel attributes may include a level of color saturation, a hue, a contrast level, a relative position, a combination thereof, and/or the like. In an embodiment, the training method 800 may determine a set of features from the first sample images and first acoustic images. In another embodiment, the training method 800 may determine a set of features from the second sample images and the second acoustic images. In a further embodiment, a set of features may be determined from labeled imaging results from a sample type and/or class different than the sample type and/or class associated with the labeled imaging results of the training data set and the testing data set. In other words, labeled imaging results from the different sample type and/or class may be used for feature determination, rather than for training a machine learning model. The training data set may be used in conjunction with the labeled imaging results from the different sample type and/or class to determine the one or more features. The labeled imaging results from the different sample type and/or class may be used to determine an initial set of features, which may be further reduced using the training data set.

The training method 800 may train one or more machine learning models using the one or more features at step 840. In one embodiment, the machine learning models may be trained using supervised learning. In another embodiment, other machine learning techniques may be employed, including unsupervised learning and semi-supervised. The machine learning models trained at 840 may be selected based on different criteria depending on the problem to be solved and/or data available in the training data set. For example, machine learning classifiers can suffer from different degrees of bias. Accordingly, more than one machine learning model can be trained at 840, and then optimized, improved, and cross-validated at step 850.

The training method 800 may select one or more machine learning models to build a predictive model at 860 (e.g., the at least one machine learning-based classifier 730). The predictive model may be evaluated using the testing data set. The predictive model may analyze the testing data set and generate classification values and/or predicted values at step 870. Classification and/or prediction values may be evaluated at step 880 to determine whether such values have achieved a desired accuracy level.

Performance of the predictive model described herein may be evaluated in a number of ways based on a number of true positives, false positives, true negatives, and/or false negatives classifications of pixels in images of samples. For example, the false positives of the predictive model may refer to a number of times the predictive model incorrectly classified a pixel(s) as depicting a particular attribute that in reality did not depict the particular attribute. Conversely, the false negatives of the machine learning model(s) may refer to a number of times the predictive model classified one or more pixels of an image of a sample as not depicting a particular attribute when, in fact, the one or more pixels did depict the particular attribute. True negatives and true positives may refer to a number of times the predictive model correctly classified one or more pixels of an image of a sample as having sufficient depicting of a particular attribute or not depicting the particular attribute. Related to these measurements are the concepts of recall and precision. Generally, recall refers to a ratio of true positives to a sum of true positives and false negatives, which quantifies a sensitivity of the predictive model. Similarly, precision refers to a ratio of true positives to a sum of true positives and false positives. Further, the predictive model may be evaluated based on a level of mean error and a level of mean percentage error. Once a desired accuracy level of the predictive model is reached, the training phase ends and the predictive model may be output at step 890. However, when the desired accuracy level is not reached a subsequent iteration of the method 800 may be performed starting at step 810 with variations such as, for example, considering a larger collection of images of samples.

Figure 9:
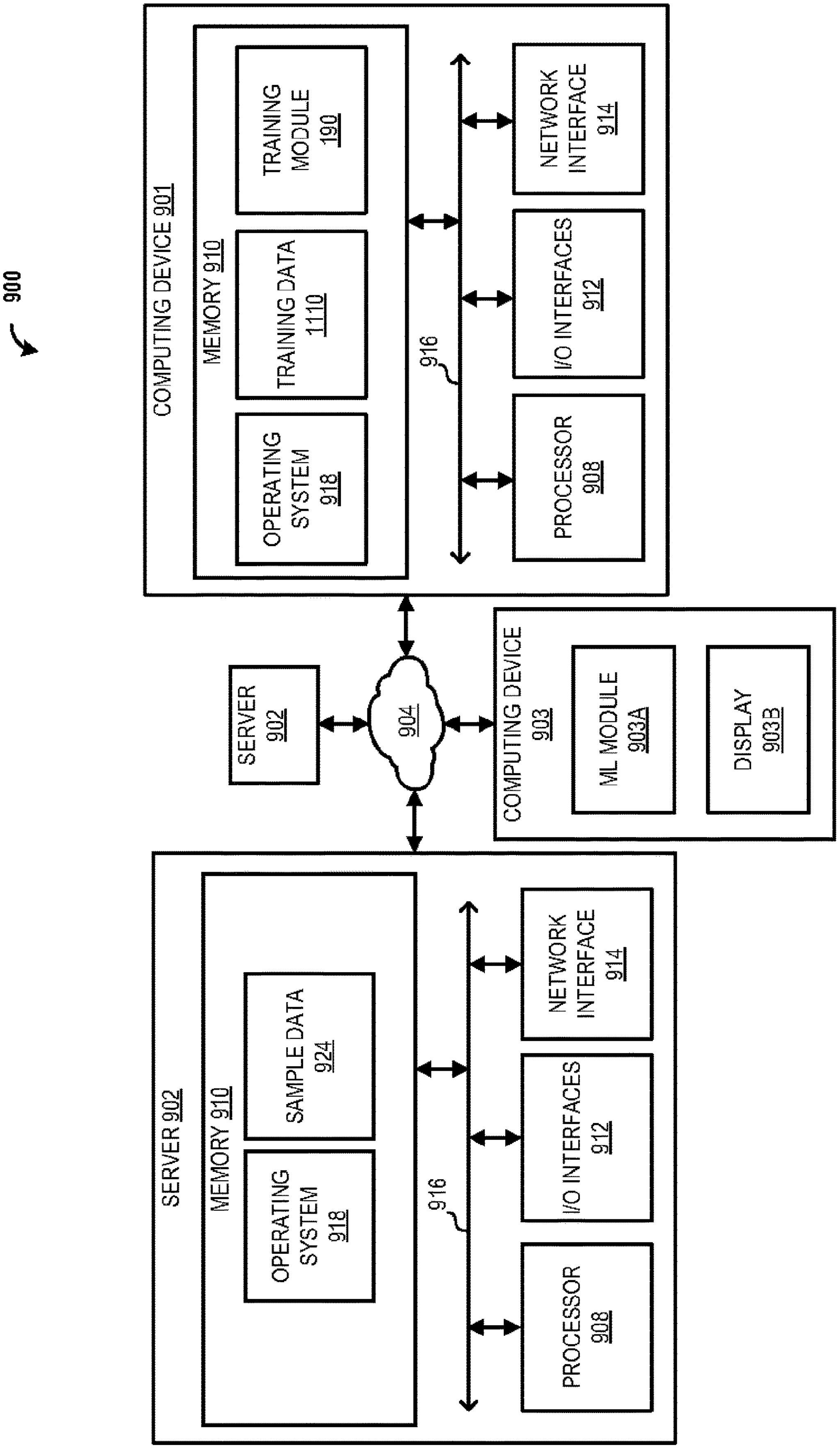
FIG. 9 shows an example system.

As discussed herein, the present methods and systems may be computer-implemented. FIG. 9 shows a block diagram depicting an environment 900 comprising non-limiting examples of a computing device 901 and a server 902 connected through a network 904. As an example, the server 104 and/or the computing device 106 of the system 100 may be a computing device 901 and/or a server 902 as described herein with respect to FIG. 9. In an aspect, some or all steps of any described method may be performed on a computing device as described herein. The computing device 901 can comprise one or multiple computers configured to store one or more of the training module 920, training data 910 (e.g., labeled images/pixels), and the like. The server 902 can comprise one or multiple computers configured to store sample data 924 (e.g., a plurality of images of samples and corresponding acoustic data). Multiple servers 902 can communicate with the computing device 901 via the network 904.

The computing device 901 and the server 902 can be a digital computer that, in terms of hardware architecture, generally includes a processor 908, memory system 910, input/output (I/O) interfaces 912, and network interfaces 914. These components (908, 910, 912, and 914) are communicatively coupled via a local interface 916. The local interface 916 can be, for example, but not limited to, one or more buses or other wired or wireless connections, as is known in the art. The local interface 916 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 908 can be a hardware device for executing software, particularly that stored in memory system 910. The processor 908 can be any custom made or commercially available processor, a central processing unit (CPU), an auxiliary processor among several processors associated with the computing device 901 and the server 902, a semiconductor-based microprocessor (in the form of a microchip or chip set), or generally any device for executing software instructions. When the computing device 901 and/or the server 902 is in operation, the processor 908 can be configured to execute software stored within the memory system 910, to communicate data to and from the memory system 910, and to generally control operations of the computing device 901 and the server 902 pursuant to the software.

The I/O interfaces 912 can be used to receive user input from, and/or for providing system output to, one or more devices or components. User input can be provided via, for example, a keyboard and/or a mouse. System output can be provided via a display device and a printer (not shown). I/O interfaces 912 can include, for example, a serial port, a parallel port, a Small Computer System Interface (SCSI), an infrared (IR) interface, a radio frequency (RF) interface, and/or a universal serial bus (USB) interface.

The network interface 914 can be used to transmit and receive from the computing device 901 and/or the server 902 on the network 904. The network interface 914 may include, for example, a 11BaseT Ethernet Adaptor, a 110BaseT Ethernet Adaptor, a LAN PHY Ethernet Adaptor, a Token Ring Adaptor, a wireless network adapter (e.g., WiFi, cellular, satellite), or any other suitable network interface device. The network interface 914 may include address, control, and/or data connections to enable appropriate communications on the network 904.

The memory system 910 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 910 may incorporate electronic, magnetic, optical, and/or other types of storage media. Note that the memory system 910 can have a distributed architecture, where various components are situated remote from one another, but can be accessed by the processor 908.

The software in memory system 910 may include one or more software programs, each of which comprises an ordered listing of executable instructions for implementing logical functions. In the example of FIG. 9, the software in the memory system 910 of the computing device 901 can comprise the training module 720 (or subcomponents thereof), the training dataset 710A, the training dataset 710B, and a suitable operating system (O/S) 918. In the example of FIG. 9, the software in the memory system 910 of the server 902 can comprise, the sample data 924, and a suitable operating system (O/S) 918. The operating system 918 essentially controls the execution of other computer programs and provides scheduling, input-output control, file and data management, memory management, and communication control and related services.

The environment 900 may further comprise a computing device 903. The computing device 903 may be a computing device and/or system, such as the server 104 and/or the computing device 106 of the system 100. The computing device 903 may use a predictive model stored in a Machine Learning (ML) module 903A to classify one or more pixels of images of samples and acoustic images as depicting or not depicting a particular attribute(s). The computing device 903 may include a display 903B for presentation of a user interface, such as the user interface described herein with respect to FIGS. 2-6.

For purposes of illustration, application programs and other executable program components such as the operating system 918 are illustrated herein as discrete blocks, although it is recognized that such programs and components can reside at various times in different storage components of the computing device 901 and/or the server 902. An implementation of the training module 720 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 10:
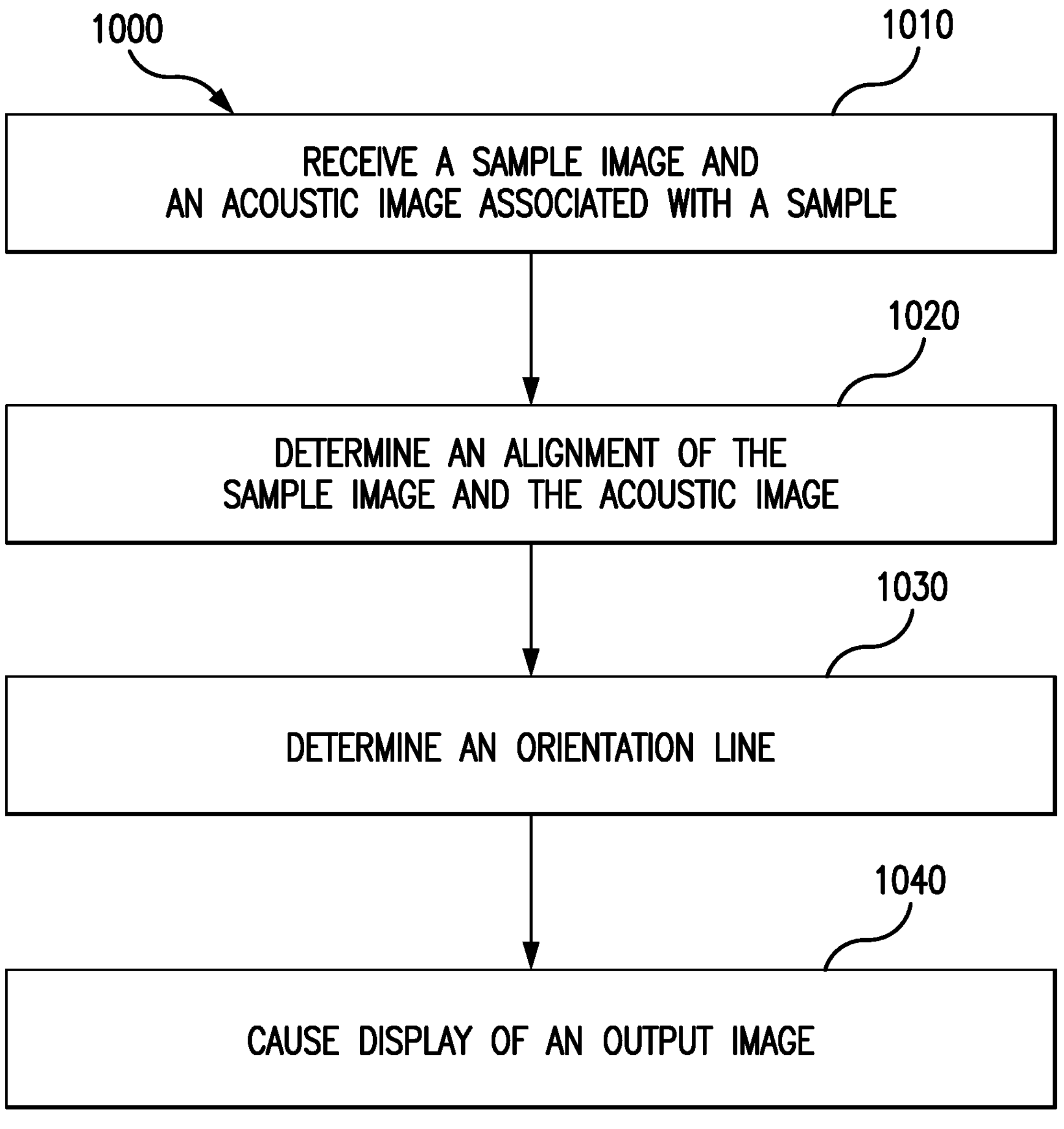
FIG. 10 shows a flowchart for an example method.

Turning now to FIG. 10, a flowchart of an example method 1000 for improved acoustic data and sample analysis is shown. The method 1000 may be performed in whole or in part by a single computing device, a plurality of computing devices, and the like. For example, the server 104 and/or the computing device 106 of the system 100, the training module 720 of the system 700, and/or the computing device 903 may be configured to perform the method 1000.

At step 1010, a computing device may receive a sample image and an acoustic image associated with a sample. The sample image may comprise one of the plurality of sample images 109, and the acoustic image may comprise an image of a borehole from which the sample was extracted (e.g., one or both of the two-way travel time image 103A or the amplitude image 103C). The sample image and the acoustic image may be analyzed by a machine learning model, such as the machine learning module 104A or the at least one machine learning-based classifier 730. The machine learning model may comprise a segmentation model.

At step 1020, the machine learning model may determine an alignment of the acoustic image and sample image. For example, the segmentation model may align the sample image with the acoustic image by classifying each pixel of a plurality of pixels of the sample image as corresponding to or not corresponding to a particular pixel(s) of the acoustic image. As another example, the machine learning model may use the segmentation model to classify each pixel of a plurality of pixels of the acoustic image as corresponding to or not corresponding to a particular pixel of the sample image(s). Thus, the segmentation model may align the sample image with the acoustic image—or vice-versa.

The acoustic image may be captured using an imaging device, such as an acoustic logging instrument/televiewer, a camera, an optical televiewer, a combination thereof, and/or the like. The imaging device may be situated within the borehole. The imaging device may capture orientation data associated with the borehole. The orientation data may be indicative of an orientation, a depth, etc., of the sample within the borehole. The machine learning model (e.g., the segmentation model) may align the sample image with the acoustic image without relying on the orientation data and/or the depth of the sample within the borehole.

At step 1030, the computing device may determine an orientation line. For example, the computing device may determine the orientation line based on the orientation data. For example, the orientation data may indicate an orientation for each pixel(s)/portion of the acoustic image. Based on the alignment of the sample image with the acoustic image, the orientation of the sample image may be determined. The orientation line may be overlain on the sample image as a virtual orientation line. An output image may be generated. The output image may comprise the sample and the virtual orientation line. In some examples, structural data associated with the sample may be determined. The structural data may comprise one or more physical features associated with the sample. The one or more physical features may comprise an edge, a fracture, a broken zone, a bedding, or a vein, etc. For example, the segmentation model may determine the structural data. At step 1040, the computing device may cause the output image to be displayed. For example, the output image may be displayed (e.g., provided) at a user interface. The user interface may be used to interact with the output image. For example, the user interface may enable a user to modify, edit, save, and/or send the output image.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:

receiving, by a computing device, a sample image depicting a physical sample extracted from a borehole and an acoustic image indicative of the borehole from which the physical sample was extracted;

determining, by a machine learning model, an alignment of the sample image with the acoustic image, wherein the machine learning model aligns the sample image with the acoustic image without relying on orientation data associated with the physical sample within the borehole;

determining, based on the alignment of the sample image with the acoustic image, and based on the orientation data associated with the physical sample, a virtual orientation line associated with the physical sample by mapping the orientation data to the sample image; and causing, at a user interface, display of an output image, wherein the output image is indicative of the sample image and the virtual orientation line.

2. The method of claim 1, wherein the machine learning model comprises at least one of: a segmentation model, an image classification model, an ensemble classifier, or a prediction model.

3. The method of claim 1, further comprising: receiving, from an imaging device, the acoustic image.

4. The method of claim 1, further comprising: classifying, by the machine learning model, a plurality of pixels of the sample image and a plurality of pixels of the acoustic image.

5. The method of claim 4, further comprising: determining, based on the classification of the plurality of pixels of the sample image and the plurality of pixels of the acoustic image, the alignment of the sample image with the acoustic image.

6. The method of claim 1, further comprising: receiving, from an imaging device, the orientation data.

7. The method of claim 1, wherein the orientation data is indicative of an orientation and a depth of the sample within a borehole.

8. An apparatus comprising:

one or more processors; and computer-executable instructions that, when executed by the one or more processors, cause the apparatus to:

receive a sample image depicting a physical sample extracted from a borehole and at least one acoustic image indicative of the borehole from which the physical sample was extracted;

determine, by a machine learning model, an alignment of the sample image with the acoustic image, wherein the machine learning model aligns the sample image with the acoustic image without relying on orientation data associated with the physical sample within the borehole;

determine, based on the alignment of the sample image with the acoustic image, and based on the orientation data associated with the physical sample, a virtual orientation line associated with the physical sample by mapping the orientation data to the sample image; and cause, at a user interface, display of an output image, wherein the output image is indicative of the sample image and the virtual orientation line.

9. The apparatus of claim 8, wherein the machine learning model comprises at least one of: a segmentation model, an image classification model, an ensemble classifier, or a prediction model.

10. The apparatus of claim 8, wherein the computer-executable instructions further cause the apparatus to: receive, from an imaging device, the acoustic image.

11. The apparatus of claim 8, wherein the computer-executable instructions further cause the apparatus to: classify, by the machine learning model, a plurality of pixels of the sample image and a plurality of pixels of the acoustic image.

12. The apparatus of claim 11, wherein the computer-executable instructions further cause the apparatus to: determine, based on the classification of the plurality of pixels of the sample image and the plurality of pixels of the acoustic image, the alignment of the sample image with the acoustic image.

13. The apparatus of claim 8, wherein the computer-executable instructions further cause the apparatus to: receive, from an imaging device, the orientation data.

14. The apparatus of claim 8, wherein the orientation data is indicative of an orientation and a depth of the sample within a borehole.

15. A non-transitory computer-readable storage medium comprising processor-executable instructions that, when executed by one or more processors of a computing device, cause the computing device to:

receive a sample image depicting a physical sample extracted from a borehole and at least one acoustic image indicative of the borehole from which the physical sample was extracted;

determine, by a machine learning model, an alignment of the sample image with the acoustic image, wherein the machine learning model aligns the sample image with the acoustic image without relying on orientation data associated with the physical sample within the borehole;

determine, based on the alignment of the sample image with the acoustic image, and based on the orientation data associated with the physical sample, a virtual orientation line associated with the physical sample by mapping the orientation data to the sample image; and cause, at a user interface, display of an output image, wherein the output image is indicative of the sample image and the virtual orientation line.

16. The non-transitory computer-readable storage medium of claim 15, wherein the machine learning model comprises at least one of: a segmentation model, an image classification model, an ensemble classifier, or a prediction model.

17. The non-transitory computer-readable storage medium of claim 15, wherein the processor-executable instructions further cause the computing device to: receive, from an imaging device, the acoustic image.

18. The non-transitory computer-readable storage medium of claim 15, wherein the processor-executable instructions further cause the computing device to: classify, by the machine learning model, a plurality of pixels of the sample image and a plurality of pixels of the acoustic image.

19. The non-transitory computer-readable storage medium of claim 18, wherein the processor-executable instructions further cause the computing device to: determine, based on the classification of the plurality of pixels of the sample image and the plurality of pixels of the acoustic image, the alignment of the sample image with the acoustic image.

20. The non-transitory computer-readable storage medium of claim 15, wherein the processor-executable instructions further cause the computing device to: receive, from an imaging device, the orientation data.

* * * * *